United States Patent [19]

Lütjens et al.

[11] Patent Number: 5,250,621
[45] Date of Patent: Oct. 5, 1993

[54] INTERPOLYMERS OF AROMATIC POLYESTERS AND RUBBERS

[75] Inventors: Holger Lütjens, Cologne; Uwe Westeppe, Mettmann; Leo Morbitzer, Cologne; Karl-Erwin Piejko, Bergisch-Gladbach; Christian Lindner, Cologne, all of Fed. Rep. of Germany

[73] Assignee: Bayer Aktiengesellschaft, Leverkusen, Fed. Rep. of Germany

[21] Appl. No.: 716,219

[22] Filed: Jun. 17, 1991

[30] Foreign Application Priority Data

Jun. 26, 1990 [DE] Fed. Rep. of Germany ....... 4020256

[51] Int. Cl.$^5$ ............... C08G 63/79; C08G 64/22; C08G 77/445; C08G 77/448
[52] U.S. Cl. ............................ 525/148; 525/132; 525/146; 525/152; 525/446; 525/464; 525/474
[58] Field of Search ............... 525/152, 132, 148, 146, 525/439, 446, 464, 474

[56] References Cited

U.S. PATENT DOCUMENTS

| | | | |
|---|---|---|---|
| 4,141,863 | 2/1979 | Coran | 525/177 |
| 4,196,276 | 4/1980 | Schreckenberg et al. | 528/176 |
| 4,386,186 | 5/1983 | Maresca et al. | 525/68 |
| 4,694,042 | 9/1987 | McKee | 525/66 |
| 4,708,986 | 11/1987 | Gerth et al. | 525/177 |
| 4,904,733 | 2/1990 | Gerth et al. | 525/146 |
| 4,937,287 | 6/1990 | Dean | 525/152 |
| 5,049,620 | 9/1991 | Hahn | 525/152 |

FOREIGN PATENT DOCUMENTS

| | | |
|---|---|---|
| 0175161 | 3/1986 | European Pat. Off. |
| 0312872 | 4/1989 | European Pat. Off. |
| 0331312 | 9/1989 | European Pat. Off. |
| 1187648 | 9/1959 | France |
| 2378055 | 8/1978 | France |

Primary Examiner—Patricia A. Short
Attorney, Agent, or Firm—Connolly & Hutz

[57] ABSTRACT

Interpolymers of aromatic polyesters and cross-linked (or partially cross-linked) rubbers and a process for their production in which a mixture of a cross-linked rubber in latex form containing reactive groups and an aqueous solution of an alkali metal or alkaline earth metal diphenolate is reacted with a solution of a dicarboxylic acid halide and/or a carbonyl halide in a water-immiscible solvent so that an aromatic polyester forms at the water/organic solvent phase boundary, which polyester goes over into the organic phase and the rubber at the same time also goes into the organic phase. The interpolymer of rubber and organic polyester thus formed is suitable for the production of moulded articles of all kinds by the methods of thermoplastic shaping such as extrusion and injection moulding.

7 Claims, No Drawings

INTERPOLYMERS OF AROMATIC POLYESTERS AND RUBBERS

This invention relates to interpolymers of aromatic polyesters and cross-linked (or partially cross-linked) rubbers and to a process for their production. The term "interpolymer" is used here to denote a product containing an aromatic polyester and a cross-linked rubber which are chemically linked together. Typical interpolymers in this sense are block copolymers and graft copolymers.

The process for the production of the interpolymers basically consists of reacting a mixture of a rubber in latex form containing reactive groups and an aqueous solution of an alkali metal or alkaline earth metal diphenolate with a solution of a dicarboxylic acid halide and/or a carbonyl halide in a water-immiscible solvent, an aromatic polyester forming at the phase boundary of water/organic solvent, which polyester goes over into the organic phase. The rubber at the same time also goes from the aqueous phase into the organic phase. If the organic phase is then separated and the organic solvent removed, an interpolymer of rubber and organic polyester is left behind. This is suitable for the production of moulded articles of all kinds by the methods of thermoplastic shaping such as extrusion and injection moulding. It has improved elasticity and elongation at break, good surface properties such as gloss, freedom from spots, uniformity and an exceptionally light colour.

The rubbers suitable for the process according to the invention are in the form of their latices. They are generally cross-linked or partially cross-linked and have softening temperatures below 0° C. These rubbers and their latices are known. Diene rubbers are particularly suitable, in particular polymers of butadiene, isoprene and chloroprene optionally with up to 30% by weight of a comonomer such as styrene, acrylonitrile, alkyl acrylate or a vinyl ether, or acrylate rubbers, in particular polymers of alkyl acrylate with optionally up to 50% by weight of comonomers such as butadiene, alkyl methacrylate, vinyl acetate, styrene, vinyl, alkyl ethers or acrylonitrile, and olefin rubbers, in particular of ethylene with comonomers such as vinyl acetate, alkyl acrylates, carbon monoxide, propylene or isobutylene, and silicone rubbers, in particular composed of structural units corresponding to the general formula $$R_nSiO_{4-n/2},$$

wherein R denotes a monovalent hydrocarbon group, e.g. $C_1$-$C_{18}$-alkyl or $C_6$-$C_{10}$-aryl, and n has an average value of from 1 to less than 3.

The rubbers are in the form of latices, as already mentioned, and the average particle diameters ($d_{50}$) in the latices are from 0.05 to 1.5 μm, in particular from 0.07 to 0.5 μm. The gel contents, which are a measure of the cross-linking, are preferably >50% by weight, most preferably >85% by weight.

The rubbers must contain reactive groups capable of reacting with aromatic polyesters in the process of formation of the latter. Examples of such groups, hereinafter denoted by X, include OH, $CH_2Hal$ (Hal=halogen, e.g. chlorine, bromine),

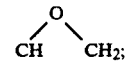

COOH; CO-Hal (Hal=halogen, e.g. chlorine, bromine).

The quantity of structural units containing reactive groups X in the rubber is from 1 to 10 mol-% of the total number of structural units of the rubber. The reactive groups X may be introduced by, for example, the copolymerisation of monomers such as hydroxyethyl methacrylate, hydroxyethyl acrylate, p-isopropenylphenol, 2-(hydroxyphenyl)-2-(p-isopropenylphenyl)-propane, chloromethylstyrene, glycidyl methacrylate, methacrylic acid or acrylic acid with the monomers which form the rubber or by the graft polymerisation of monomers containing the reactive groups X on the finished rubber. The reactive groups X may also be produced, either before or during the polycondensation, by polymer analogous reactions on rubbers with copolymerised structural units containing reactive groups Y. Suitable reactive groups Y (which may at least in part be converted into reactive groups X) include masked phenol groups such as phenol esters having the following structure:

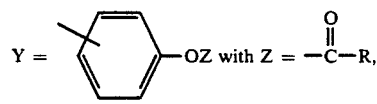

wherein $C=C_1$-$C_4$-alkyl, or trialkylsilane derivatives having the following structure:

wherein $R=C_1$-$C_4$-alkyl which are at least partly split up in the alkaline or acid medium to form the phenol group. The quantity of copolymerised or grafted structural units containing reactive groups Y amounts to 1 to 10 mol-% of the total structural units of the rubber.

Reactive groups Y may be introduced by, for example, the copolymerisation of monomers such as p-isopropenyl phenylacetate, p-acetoxystyrene or tri-methyl-(4-isopropenylphenoxy)-silane with the monomers from which the rubber is built up or by the graft polymerisation of monomers containing reactive groups Y on the rubber.

Acrylate rubbers are particularly preferred. These are preferably obtained by radical emulsion polymerisation. They are cross-linked, particulate emulsion polymers of $C_1$-$C_8$-alkylacrylates, in particular $C_2$-$C_8$-alkylacrylates, optionally mixed with up to 30% by weight of a comonomer such as styrene, methylmethacrylate, butadiene, vinyl methyl ether or acrylonitrile and at least one polyfunctional cross-linking comonomer such as divinylbenzene, glycol bis-acrylate, butanediol bis-acrylates, bis-acrylamide, phosphoric acid triallyl esters, allyl esters of acrylic acid, allyl esters of methacrylic acid, triallyl cyanurate or triallyl isocyanurate in quantities of up to 4% by weight, based on the total quantity of monomers. The rubbers in addition contain the reactive groups X and/or Y which are preferably produced by incorporation in hydroxyethylacrylate, hydroxyethyl methacrylate or p-isopropenyl-phenylacetate.

Rubbers having a core/sheath structure as described, for example, in DE-OS 32 00 070 and DE-OS 37 04 657 may also be used.

The aromatic polyesters produced according to the invention (in the context of this invention the term includes aromatic polyesters, aromatic polycarbonates and aromatic polyester carbonates) are based on diphenols corresponding to formula (I)

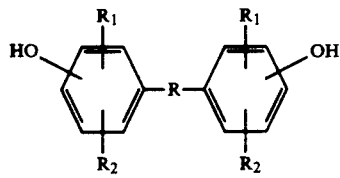

wherein
$R_1$ and $R_2$=H, $C_1$-$C_4$-alkyl or halogen, preferably H, $CH_3$, Cl or Br,
R = a single bond, $C_1$-$C_{12}$-alkylene, $C_5$-$C_{20}$-cycloalkylene or arylene, —S—,

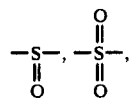

or —O—, preferably —$CH_2$—, —$C_2H_4$— or —$C_3H_6$—

The following are examples of suitable diphenols corresponding to formula (I): Hydroquinone, resorcinol, 4,4-dihydroxyphenyl, 2,2-bis-(4-hydroxyphenyl)-propane, 2,4-bis-(4-hydroxyphenol)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)propane, 2,2-bis-(3,5-dibromo-4-hydroxyphenyl)-propane and 1,1-bis-(4-hydroxyphenyl)-3,3,5-trimethylcyclohexane. The following are preferred diphenols corresponding to formula (I): 2,2-Bis-(4-hydroxyphenyl)-propane, 2,2-bis-(3,5-dichloro-4-hydroxyphenyl)-propane, 1,1-bis-(4-hydroxyphenyl)-cyclohexane and 1,1-bis-(4-hydroxyphenyl)-3,3,5-trimethyl-cyclohexane (DE-OS 3 832 396), 2,2-bis-(4-hydroxyphenyl)-propane being particularly preferred.

To produce aromatic polycarbonates, these diphenols are reacted with carbonyl halides such as carbonyl bromide, phosgene or its mixtures or bis-chloroformates of 2,2-bis-(4-hydroxyphenyl)-propane; 2,2-bis-(4-hydroxy-3,5-dichlorophenyl)-propane or hydroquinone.

For the production of aromatic polyesters, the reaction is carried out with dicarboxylic acid halides such as, for example, oxalyl chloride, succinyl chloride, fumaryl chloride, glutaryl chloride, adipyl chloride, pimelyl chloride, suberyl chloride, azelayl chloride, sebacyl chloride, phthaloyl chloride, isophthaloyl chloride or terephthaloyl chloride. Among these, terephthaloyl chloride, isophthaloyl chloride and mixtures thereof are preferred; the ratio of isophthaloyl groups to terephthaloyl groups in these mixtures is preferably from 3:7 to 7:3, in particular from 4.5:5.5 to 5.5:4.5.

For the production of polyester carbonates, a mixture of carbonyl halide and dicarboxylic acid halide is used in such a quantity that up to 90 mol-%, preferably up to 45 mol-% of carbonate groups are formed, based on the sum of ester and carbonate groups.

The process according to the invention itself may be carried out according to the known rules of phase interface polycondensation as described, for example, in Chemistry and Physics of Polycarbonates, Polymer Reviews, Vol.IX, pages 33 et seq, Interscience Publishers (1964).

According to the invention, alkali metal or alkaline earth metal salts of diphenols of formula (I) are reacted as aqueous solutions with dicarboxylic acid halides and/or carbonyl halides in water immiscible, inert organic solvents in the presence of aqueous rubber latices containing reactive groups X and/or Y to form the interpolymers according to the invention. The process according to the invention may, for example, be carried out as follows: The aqueous latex of a cross-linked rubber is mixed with an aqueous solution of a salt of the diphenol of formula (I) at 0° to 50° C., preferably at 10 to 25° C. The rubber latices preferably have a solids content of from 10 to 50% by weight, in particular from 15 to 40% by weight. The aqueous diphenolate solution may be prepared by, for example, dissolving the diphenol of formula (I) in an aqueous alkali metal hydroxide solution, preferably in sodium hydroxide solution. A preferred diphenol of formula (I) is 2,2-bis-(4-hydroxyphenyl)propane. A water-immiscible, inert organic solvent, preferably methylene chloride and/or chlorobenzene, optionally containing phase transfer catalysts such as quaternary ammonium compounds in solution is then added in about 20 to 80 times the weight of the rubber in the latex and the components are at the same time mixed together. The dicarboxylic acid halide or carbonyl halide or both together are then introduced into this vigorously stirred mixture at 0° to 50° C., preferably at 10° to 25° C., within a period from 5 minutes to 5 hours, preferably from 5 minutes to 2 hours. Terephthaloyl chloride and isophthaloyl chloride and mixtures thereof are preferred dicarboxylic acid halides and phosgene is a preferred carbonyl halide.

Alternatively, the aqueous rubber latex may first be mixed at 0° to 50° C., preferably 10° to 25° C., with the inert organic solvent optionally containing phase transfer catalysts, and the aqueous solution of a salt of the diphenol of formula (I) and the dicarboxylic acid halides and/or carbonyl halides may then be added to the reaction mixture within a period of from 5 minutes to 5 hours, preferably from 5 minutes to 2 hours, at to 50° C., preferably at 10° to 25° C., optionally with stirring. When both dicarboxylic acid halides and carbonyl halides are used, it is advantageous first to add the dicarboxylic acid halides and then the carbonyl halide. Catalysts may be added after addition of the carbonyl halide, for example, tertiary amines such as triethylamine or N-ethylpiperidine. The molecular weight of the aromatic polyester, within the meaning of the definition given above, may be regulated in known manner by the addition of a chain terminator. Examples of suitable chain terminators include phenol and phenols containing $C_1$-$C_{22}$-alkyl groups, such as tert.-butylphenol and p-isooctylphenol. Tertiary amines, alkali metal hydroxides or alkaline earth metal hydroxides may be used as acid acceptors, preferably sodium hydroxide.

The ratio by weight of the diphenol of formula I to the rubber latex is from 10:1 to 1:40.

The ratio by weight of polyester to rubber in the interpolymers according to the invention is from 90:10 to 5:95, preferably from 90:10 to 10:90.

The interpolymers according to the invention may be isolated by first separating the organic phase from the aqueous phase and then washing the organic phase with mineral acids such as phosphoric acid or organic acids until neutral and finally with water until free from electrolytes. In some cases it is advantageous to neutralise the whole reaction mixture with mineral acids or organic acids and only then to separate the organic phase and wash with water. The interpolymer may be isolated from the organic phase, for example by removal of the organic solvent by distillation, by evaporation in suitable apparatus or by coagulation.

The separated organic phase may be coagulated by, for example, its introduction with vigorous mixing into organic liquids which have a low solubility for the polyesters or by the addition of these organic liquids to the organic phase. The organic liquids used for this purpose are preferably aliphatic hydrocarbons and mixtures thereof, such as hexane, heptane or lower aliphatic alcohols such as methanol, ethanol or isopropanol.

After coagulation, the interpolymer may be separated, for example by filtration or centrifuging, and if necessary washed, e.g. with water. The interpolymers according to the invention are suitable for the production of moulded products of all types, e.g. films, fibres and injection moulded articles.

EXAMPLES

1. Preparation of the Rubber Latices 1.1—1,030 Parts by weight of water and 5 parts by weight of the sodium salt of $C_{14}$–$C_{18}$-alkyl sulphonic acids are introduced into a reactor under nitrogen and heated to 70° C. A mixture of 72 parts by weight of n-butylacrylate, 8 parts by weight of p-isopropenyl phenyl acetate (7.5 mol-%) and 0.4 parts by weight of 1,4-butanediol diacrylate is added. A solution of 3 parts by weight of potassium peroxydisulphate and 60 parts by weight of water is then added at 70° C. and the following are added at a uniform rate within 5 hours:

| Inflow 1: | 828 parts by weight of n-butyl-acrylate |
| --- | --- |
| | 92 parts by weight of p-isopropenyl phenyl acetate (7.5 mol-%) |
| | 4.6 parts by weight of 1,4-butanediol diacrylate |
| Inflow 2: | 20 parts by weight of the sodium salt of $C_{14}$–$C_{18}$-alkyl sulphonic acid |
| | 700 parts by weight of water. |

The mixture is then stirred for 4 hours at 70° C. The latex obtained has a solids content of 36.3% by weight. The gel content of the polymer is 92.0% by weight (determined in tetrahydrofuran). The latex is diluted to a solids content of 20% by weight with water and used in the Examples.

1.2—A rubber latex is prepared as in Example 1.1 from:

76 parts by weight of n-butyl acrylate
4 parts by weight of 2-hydroxyethyl methacrylate (5 mol-%)
0.4 parts by weight of 1,4-butanediol-diacrylate

| Inflow 1: | 874 parts by weight of n-butyl-acrylate |
| --- | --- |
| | 46 parts by weight of 2-hydroxyethylmethacrylate (5 mol-%) |
| | 4.6 parts by weight of 1,4-butanediol diacrylate |
| Inflow 2: | 20 parts by weight of the sodium salt of $C_{14}$–$C_{18}$-alkylsulphonic acids |
| | 700 parts by weight of water. |

The latex obtained has a solids content of 36.2% by weight. The gel content of the polymer is 93.0% by weight (determined in tetrahydrofuran).

1.3—A latex is prepared as in Example 1.1 from:

| | 80 parts by weight of n-butyl acrylate |
| --- | --- |
| | 0.4 parts by weight of 1,4-butanediol diacrylate |
| Inflow 1: | 920 parts by weight of n-butyl acrylate |
| | 4.6 parts by weight of 1,4-butanediol diacrylate |
| Inflow 2: | 20 parts by weight of the sodium salt of $C_{14}$–$C_{18}$-alkyl sulphonic acids |
| | 700 parts by weight of water. |

The latex obtained has a solids content of 36.5% by weight. The gel content of the polymer is 90.0% by weight (determined in tetrahydrofuran). The latex is diluted to a solids content of 20% by weight with water and used in the following Examples.

Preparation of the Interpolymers 2.1—45 g of the latex from Example 1.1 having a solids content of 20% by weight are mixed with 450 g of methylene chloride containing 0.645 g of tetrabutyl ammonium bromide in solution. The following two inflows are introduced at a uniform rate within 15 minutes with constant mixing:

| Inflow 1: | A solution of |
| --- | --- |
| | 22.83 g (0.10 mol) of 2,2-bis-(4-hydroxyphenyl)-propane (hereinafter referred to as bisphenol A) and |
| | 10.0 g (0.25 mol) of sodium hydroxide in |
| | 560 g of water |
| Inflow 2: | A solution of |
| | 10.36 g (0.051 mol) of terephthaloyl chloride and |
| | 10.36 g (0.051 mol) of isophthaloyl chloride in |
| | 50 g of methylene chloride. |

The reaction mixture is then stirred for one hour and the aqueous phase is separated for working up the product. The organic phase is washed with dilute phosphoric acid until neutral and then washed free from electrolyte with water. The interpolymer is precipitated by mixing the organic phase with petroleum ether and separated from the organic liquids by filtration, washed with water and dried.

Quantity of polymer: 42.8 g
Gel content (determined in tetrahydrofuran): 26.4% by weight
[$\eta$] of the sol phase: 0.62
[$\eta$] Intrinsic viscosity, determined in tetrahydrofuran at 25° C.

2.2—(Comparison to 2.1) Example 2.1 is repeated but with 45 g of the latex from Example 1.3 (20% by weight).

Quantity of polymer: 43.0 g
Gel content (determined in tetrahydrofuran): 17.7% by weight
[$\eta$] of the sol phase: 0.65

2.3—The procedure is the same as in Example 2.1 but using
- 120 g of the rubber latex of Example 1.1 (solids content: 20% by weight) and
- 1450 g of methylene chloride containing 0.645 g of tetrabutyl ammonium bromide in solution.

Inflow 1: as in Example 2.1
Inflow 2: as in Example 2.1

Quantity of polymer: 57.5 g
Gel content (determined in tetrahydrofuran): 49.5% by weight
[$\eta$] of the sol phase: 0.47

2.4—(Comparison to 2.3) The procedure is the same as in Example 2.1 but using 120 g of the rubber latex from Example 1.3 (20% by weight).

Quantity of polymer: 58 g
Gel content (determined in tetrahydrofuran): 36.2% by weight
[$\eta$] of the sol phase: 0.52

2.5—The procedure is the same as in Example 2.1 but using
- 90 g of the rubber latex from Example 1.1 (solids content: 20% by weight) and
- 1200 g of methylene chloride containing 0.645 g of tetrabutyl ammonium bromide in solution

| Inflow 1: | A solution of |
|---|---|
| | 11.42 g (0.050 mol) of bisphenol A and |
| | 5.0 g (0.125 mol) of sodium hydroxide in |
| | 280 g of water |
| Inflow 2: | A solution of |
| | 5.18 g (0.0255 mol) of terephthaloyl chloride and |
| | 5.18 g (0.0255 mol) of isophthaloyl chloride in |
| | 35 g of methylene chloride. |

Quantity of polymer: 35.0 g
Gel content (determined in tetrahydrofuran): 56.5% by weight
[$\eta$] of the sol phase: 0.31

2.6—(Comparison to 2.5): The procedure is the same as in Example 2.1 but using 90 g of the rubber latex from Example 1.3 (20% by weight).

Quantity of polymer: 35.2 g
Gel content (determined in tetrahydrofuran): 43.8% by weight
[$\eta$] of the sol phase: 0.36

2.7—75 g of the rubber latex from Example 1.1 having a solids content of 20% by weight are first mixed with a solution of
- 22.83 g (0.10 mol) of bisphenol A and
- 10.0 g (0.25 mol) of sodium hydroxide in
- 560 g of water.

and then with 630 g of methyl chloride.
A solution of
- 10.36 g (0.051 mol) of terephthaloyl chloride and
- 10.36 g (0.051 mol) of isophthaloyl chloride in
- 50 g of methylene chloride is then added within 15 minutes with constant mixing. The reaction mixture is then stirred for one hour and worked up as in Example 2.1.

Quantity of polymer: 49.5 g
Gel content (determined in tetrahydrofuran): 36.9% by weight
[$\eta$] of the sol phase: 0.46

2.8—(Comparison to 2.7): The procedure is the same as in Example 2.7, using 75 g of the rubber latex from Example 1.3 (20% by weight).

Quantity of polymer: 49.2 g
Gel content (determined in tetrahydrofuran): 26.6% by weight
[$\eta$] of the sol phase: 0.51

2.9—450 g of methylene chloride containing 0.645 g of tetrabutyl ammonium chloride in solution are added with thorough mixing to 18.0 g of the rubber latex from Example 1.2 which has a solids content of 36.2% by weight. A solution of
- 0.52 g (2.6 mmol) of terephthaloyl chloride,
- 0.52 g (2.6 mmol) of isophthaloyl chloride and
- 15 g of methylene chloride is then added and the reaction mixture is stirred for 30 minutes.

The following are then added at a uniform rate within 15 minutes with constant mixing:

| Inflow 1: | A solution of |
|---|---|
| | 22.83 g (0.10 mol) of bisphenol A and |
| | 10.0 g (0.25 mol) of sodium hydroxide in |
| | 560 g of water |
| Inflow 2: | A solution of |
| | 9.84 g (48.4 mmol) of terephthaloyl chloride and |
| | 9.84 g (48.4 mmol) of isophthaloyl chloride in |
| | 50 g of methylene chloride. |

The reaction mixture is then stirred for a further hour and worked up as in Example 2.1.

Quantity of polymer: 41.8 g
Gel content (determined in tetrahydrofuran): 20.7% by weight
[$\eta$] of the sol phase: 0.48

2.10—(Comparison to 2.9): The procedure is the same as in Example 2.9, using 18.0 g of the rubber latex from Example 1.3 with a solids content of 36.5% by weight.

Quantity of polymer: 42.0 g
Gel content (determined in tetrahydrofuran): 14.2% by weight
[$\eta$] of the sol phase: 0.54

2.11—29 g of the rubber latex from Example 1.1 with a solids content of 20% by weight are mixed with a solution of
- 22.83 g (0.10 mol) of bisphenol A, and
- 24.0 g (0.60 mol) of sodium hydroxide in
- 250 g of water.

250 g of methylene chloride containing 0.965 g of tetrabutyl ammonium bromide in solution are added with mixing. 19.8 g (0.20 mol) of phosgene are then introduced and stirring is continued for 25 minutes. Working up as in Example 2.1.

Quantity of polymer: 30.0 g
Gel content (determined in tetrahydrofuran): 24.2% by weight
[$\eta$] of the sol phase: 0.32

2.12—(Comparison to 2.11): The procedure is the same as in Example 2.11, using 29 g of the rubber latex from Example 1.3 (20% by weight).

Quantity of polymer: 30.4 g

Gel content (determined in tetrahydrofuran): 16.7% by weight

[η] of the sol phase: 0.37.

TABLE 1

Comparison of the calculated gel contents with the experimentally found gel contents of the polymers of Examples 2.1-2.12.

| Examples | Calculated gel content in % by weight[2] | Experimentally found gel content in % by weight[1] | Proportion of aromatic polyester in the interpolymer in % by weight |
|---|---|---|---|
| 2.1. | 18.4 | 26.4 | 30.3 |
| 2.2.* | 18.0 | 17.7 | 0 |
| 2.3. | 36.8 | 49.5 | 25.7 |
| 2.4.* | 36.0 | 36.2 | 0 |
| 2.5. | 46.0 | 56.5 | 18.4 |
| 2.6.* | 45.0 | 43.8 | 0 |
| 2.7. | 27.6 | 36.9 | 25.2 |
| 2.8.* | 27.0 | 26.9 | 0 |
| 2.9. | 14.2 | 20.7 | 31.4 |
| 2.10.* | 13.8 | 14.2 | 0 |
| 2.11. | 17.1 | 24.2 | 29.3 |
| 2.12.* | 16.8 | 16.7 | 0 |

*Comparison Example
[1] The gel contents are determined according to M. Hoffmann et al, Polymeranalytik I and II, Georg Thieme Verlag, Stuttgart (1977).
[2] The calculated gel contents of the end products are obtained from the experimentally determined gel contents of the rubbers multiplied by the proportions by weight of the rubber in the end product.

When the rubber from Example 1.3 is used, the calculated gel contents correspond to the experimentally found (see Comparison Examples 2.2., 2.4., 2.6., 2.8., 2.10. and 2.12.). When the rubbers from Examples 1.1. and 1.2. are used, the experimentally found gel contents are always greater than the calculated gel contents, i.e. complete separation into the components is no longer possible (see Examples 2.1., 2.3., 2.5., 2.7., 2.9. and 2.11.). This means that partial chemical cross-linking has taken place between the polyester and the rubber, i.e. an interpolymer has been formed.

We claim:

1. A process for the production of interpolymers of aromatic polyesters and cross-linked (or partially cross-linked) rubbers, said aromatic polyesters and rubbers being chemically linked together to form said interpolymers, wherein a mixture of i) a cross-linked rubber in latex form containing reactive groups capable of reacting with said aromatic polyesters as they are formed, and ii) an aqueous solution of an alkali metal or alkaline earth metal diphenolate, is reacted with a solution of a dicarboxylic acid halide and/or a carbonyl halide in a water-immiscible organic solvent, to form an aromatic polyester at the water/organic solvent phase boundary, which aromatic polyester goes over into the organic phase together with the rubber to form the interpolymer.

2. A process according to claim 1, wherein the cross-linked (or partially cross-linked) rubbers used are diene rubbers and/or acrylate rubbers and/or silicone rubbers and/or olefin rubbers in latex form containing reactive groups X=OH; —CH$_2$—Hal (Hal=halogen),

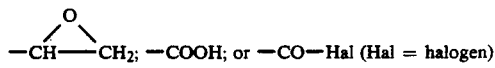
—CH——CH$_2$; —COOH; or —CO—Hal (Hal = halogen)

and/or

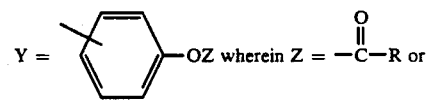
Y = [phenyl]—OZ wherein Z = —C—R or

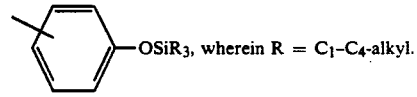
[phenyl]—OSiR$_3$, wherein R = C$_1$-C$_4$-alkyl.

3. A process according to claim 2, wherein the rubbers are used as aqueous latices (emulsions) having average particle diameters (d$_{50}$) of from 0.05 to 1.5 μm and gel contents above 50% by weight.

4. A process according to claim 1, wherein diphenols corresponding to the following formula

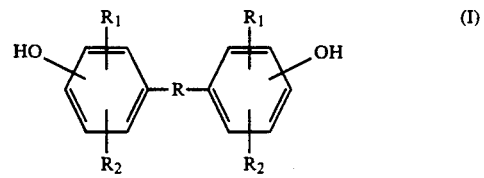

wherein
R$_1$ and R$_2$=H, C$_1$-C$_4$-alkyl or halogen, and
R=a single bond, C$_1$-C$_{12}$-alkylene, C$_5$-C$_{20}$-cycloalkylene or arylene,

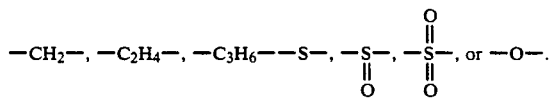

5. A process according to claim 1, wherein the ratio by weight of diphenol:rubber latex is from 10:1 to 1:40.

6. A process according to claim 4, wherein R$_1$ and R$_2$=H, CH$_3$, Cl or Br.

7. A process according to claim 4, wherein R=—CH$_2$—, —C$_2$H$_4$— or —C$_3$H$_6$—.

* * * * *